(No Model.) 3 Sheets—Sheet 1.
C. K. WELCH.
PNEUMATIC TIRE.
No. 590,715. Patented Sept. 28, 1897.
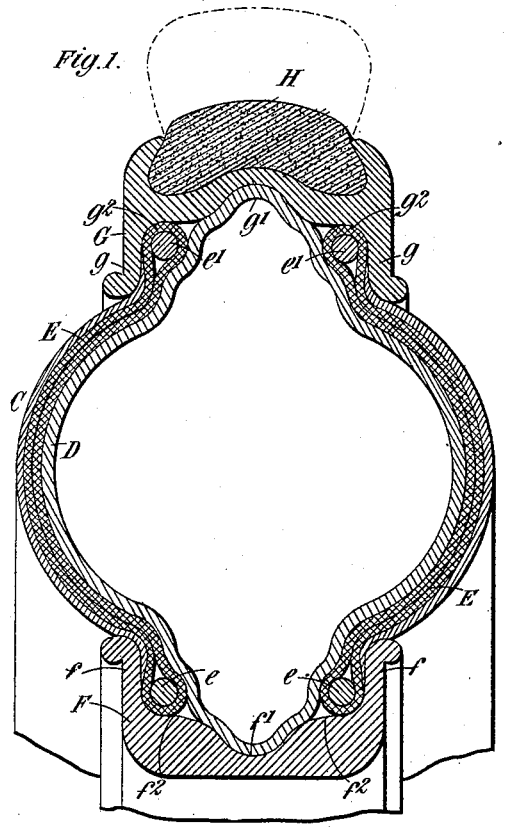
Fig. 1.
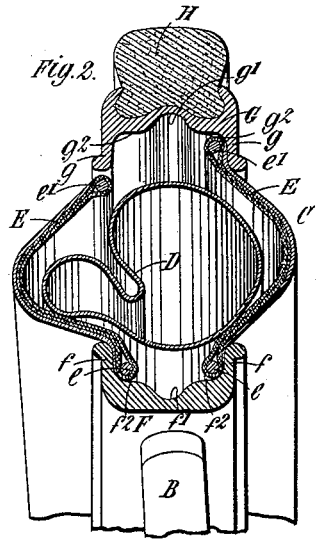
Fig. 2.
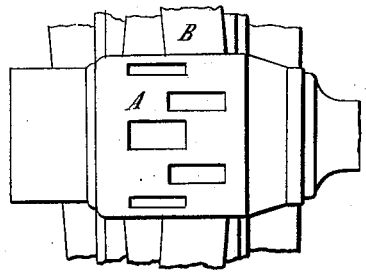
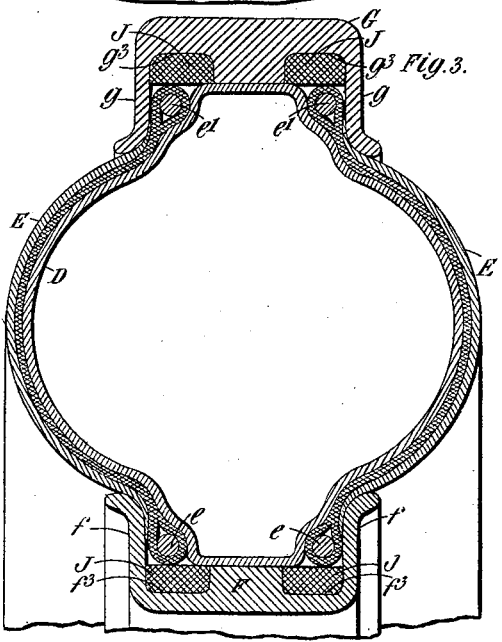
Fig. 3.
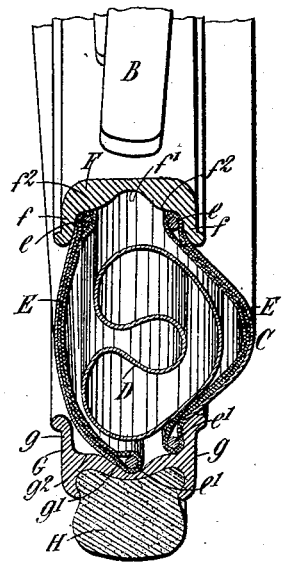
Witnesses:
Edwin B. Hopkinson.
G. W. Martling
Charles K. Welch, Inventor
by Ken. Curtis & Page
Att'ys (No Model.) 3 Sheets—Sheet 2.
C. K. WELCH.
PNEUMATIC TIRE.
No. 590,715. Patented Sept. 28, 1897.
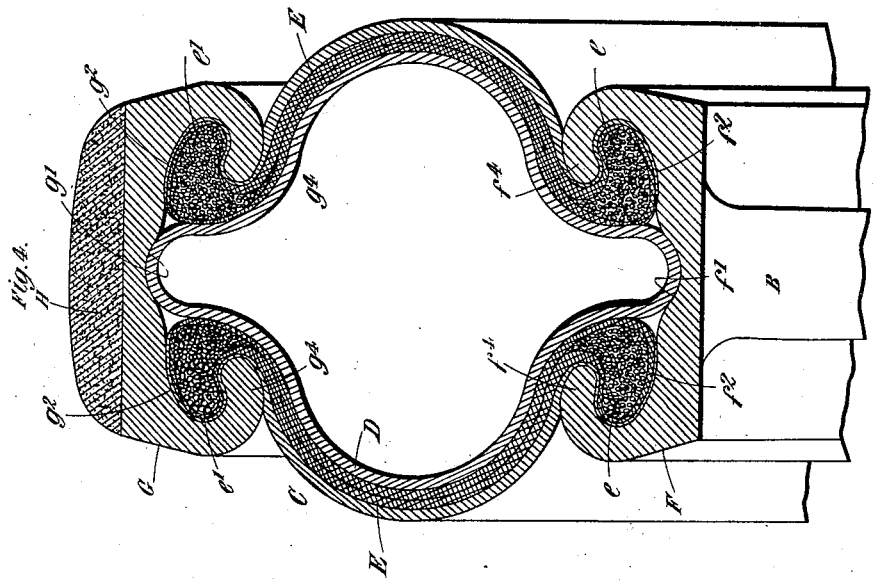
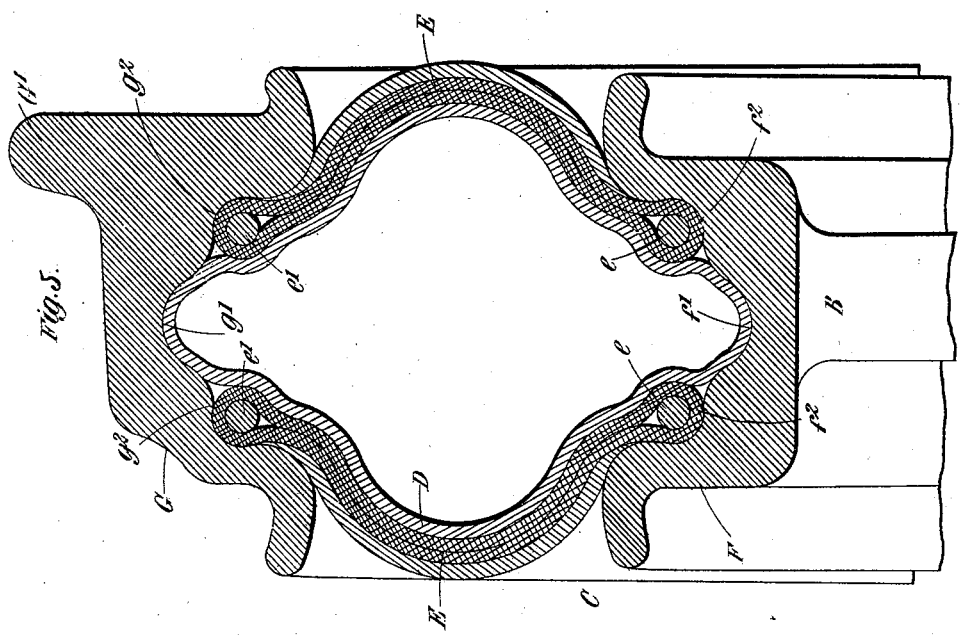
Witnesses
Edwin B. Hopkinson
G. N. Martling
Charles K. Welch, Inventor
by Kerr, Curtis & Page.
Att'ys (No Model.) 3 Sheets—Sheet 3.
C. K. WELCH.
PNEUMATIC TIRE.
No. 590,715. Patented Sept. 28, 1897.
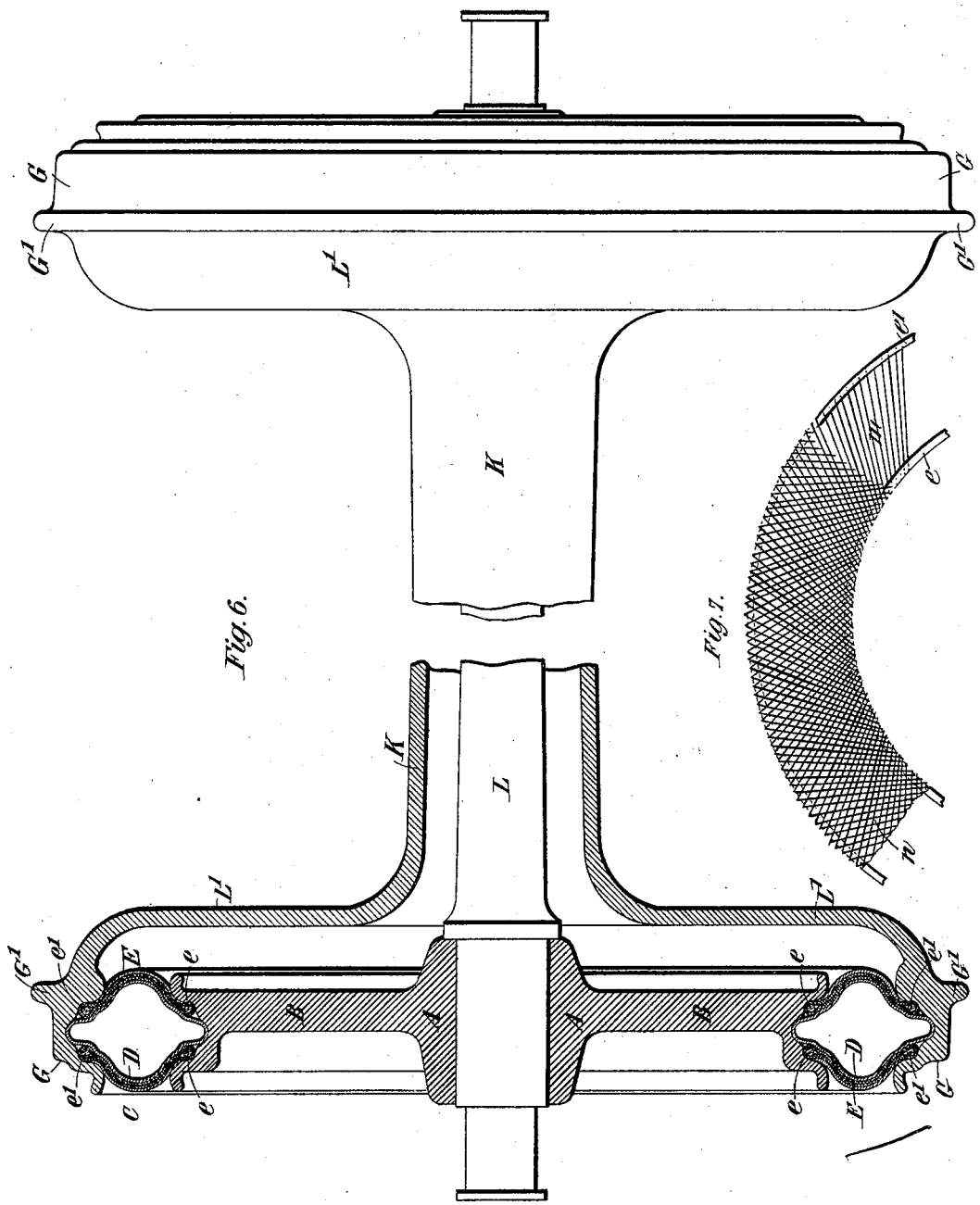
Witnesses
Edwin B. Hopkinson
G. W. Martling
Charles K. Welch, Inventor
by Kerr, Curtis & Page
Attys

UNITED STATES PATENT OFFICE.

CHARLES KINGSTON WELCH, OF COVENTRY, ENGLAND.

PNEUMATIC TIRE.

SPECIFICATION forming part of Letters Patent No. 590,715, dated September 28, 1897.

Application filed January 27, 1897. Serial No. 620,881. (No model.)

*To all whom it may concern:*

Be it known that I, CHARLES KINGSTON WELCH, engineer, a subject of the Queen of Great Britain, residing at Park House, Coventry, England, have invented certain new and useful Improvements in Pneumatic Wheels, of which the following is a specification, reference being had to the accompanying drawings.

This invention relates to an improved construction of pneumatic wheels chiefly intended for vehicles, although not confined to such use; and the said invention has for its chief object to secure in a novel manner between the hub and the periphery of the wheel an annular air-cushion so constructed and combined with the wheel that no creeping of one part of the wheel over another part can take place and so that the wheel can be used not only for supporting a load, but also for driving purposes.

My improved wheel is very suitable for tram-cars, omnibuses, vans, motor-driven vehicles, and the like where absence of vibration is desirable, and generally for all heavy road-vehicles, whether drawn by muscular power or propelled by mechanical means and whether the tractive or propelling force is applied directly to the body of the vehicle or is transmitted through the axle or axles or otherwise. The inclosing cover of the air-chamber is formed by two concentric rigid rings, one of larger diameter than the other, and two flexible side rings. The rigid rings have flanges at each side, the flanges of the larger ring being turned inwardly or toward the axis and those of the smaller ring being turned outwardly or away from the axis. The flexible side rings are furnished with cores in their edges or have thickened edges which when engaged with the rigid rings answer the same purpose as cores—that is to say, the inner or smaller edge is rendered by the thickening or by the core practically inextensible, and the outer or larger edge is similarly rendered practically incompressible, either alone or when supported by the rigid ring. The said cores, which may consist of endless rings of strong wire, are supported laterally by the flanges of the rigid rings, against which they are pressed by the air in the inflated air-chamber. The flexible side rings may be made of layers of woven fabric suitably arranged, or they may be made of a large number of strong flexible threads crossing each other in any desired or suitable manner. The outer surfaces of the flexible rings may be rendered waterproof by india-rubber or by any suitable varnish or other material. I prefer to use an inner inflatable india-rubber tube to contain the air under pressure, although such a tube may in some instances be dispensed with.

Referring to the accompanying drawings, which illustrate my invention, Figure 1 is a transverse section of a portion of a wheel furnished with an air-chamber and with an outer rim in which is inserted a solid india-rubber tire. Fig. 2 is a transverse central section, on a smaller scale, of the whole of the said wheel, showing the manner of detaching the incompressible cores from the outer ring or rim. Figs. 3 and 4 are sections similar to Fig. 1, but illustrating modifications hereinafter described. Fig. 5 is a similar section of a portion of a wheel constructed according to my invention and adapted to run on a rail. Fig. 6 is a half-central longitudinal section and half-elevation of a pair of tram-car wheels connected by a tube or sleeve in accordance with my invention; and Fig. 7 is a side view, on a smaller scale, of one of the annular flexible rings.

Like letters of reference denote corresponding parts in the several figures.

A is the hub of the wheel.

B B are the spokes or web, as the case may be.

C is the annular-air cushion, comprising in the preferred form an inner inflatable tube D, inclosed between flexible side rings E E, an inner rigid ring F, and an outer rigid ring G, concentric with the ring F. The rings F and G are formed with side flanges $f\ g$, respectively, the former being turned outwardly and the latter inwardly, as shown. The ring G in the case of a vehicle-wheel may be constructed to form the tire to run direct on the road, or rail or it may be fitted with a solid rubber tread, as hereinafter described.

Referring to Fig. 1, the rigid ring F is formed with a central annular groove $f'$ and with shoulders $f^2$, and the ring G is formed with a similar central annular groove $g'$ and shoulders $g^2$. The shoulders $f^2\ g^2$ serve to maintain the cores $e\ e'$ of the flexible rings E E concentric with their respective rings F G. The said flexible rings are made from woven fabric or from a number of crossed threads held together, as hereinafter described. The endless wire cores $e\,e'$ are secured in the edges of the rings E E in any suitable manner—for example, by turning the edges of the fabric over the wires and stitching and solutioning the edges. The endless wire rings have such diameters that they will just lie within the rigid rings and upon the bearing-shoulders $f^2\,g^2$ of said rings. When the air-chamber is inflated by a pump applied to a valve in the manner adopted for inflating pneumatic tires, the flexible side rings E E bulge outwardly, as indicated in the drawings, and put the inner cores $e$ in tension and the outer cores $e'$ in compression, and the said cores, in combination with the flanges $f\,g$, keep the flexible rings in position and prevent them from being blown out by the air-pressure. The bulging of the flexible rings is very considerable, so that when the vehicle is supporting a heavy load the contraction of the said rings at the upper part of the wheel due to such load is not sufficient to produce any undue stress in the fabric or material or to draw the cores inward to such an extent as would be liable to result in the disconnection of the parts of the wheel. It will be obvious that the pressure of the air keeps the cores upon the shoulders $f^2 g^2$ and prevents them from sliding into the grooves $f'\,g'$. The flexible side rings, together with the concentric rigid rings, form an inextensible casing for the inner inflatable tube. The flexible rings can be removed when desired by first deflating the inner tube and then pushing one of the rings or cores $e'$ inward, so that one portion of it rests in the bottom of the central groove $g'$, in which position the said core is eccentric to the flanges $g$, and one side of the core opposite to that which is in the bottom of the central groove can be withdrawn from under the inner edge of the flange $g$, as indicated in Fig. 2, whereupon the whole of the core will follow. The core $e'$ of the other flexible ring is removed in a similar manner. The inextensible cores $e\,e$ at the inner edges of the flexible rings are removed by placing them at one side in the bottom of the groove, so as to allow of the other side being lifted over the flange in the manner now so well known in connection with pneumatic tires furnished with inextensible cores on the inner edges of the covers for securing them to the rims. The presence of the cores $e\,e'$ prevents creeping of the flexible rings in their respective rigid rings.

The outer ring G is constructed to receive a solid india-rubber tire H of ordinary construction, or any other suitable tire may be applied to this ring. In Fig. 2 I have shown a thick solid tire, and in Fig. 1 I have shown a thin tire in full lines and a thick one in broken lines.

It is obvious that the air-cushion above described may be constructed to occupy any position between the hub and the periphery of the wheel, or in small wheels it may even take up the whole of the space usually occupied by the spokes.

The rims F and G (shown in Fig. 3) are furnished with two side grooves $f^3\,g^3$ in lieu of the single central groove shown in Fig. 1, and when the flexible rings are in position the said grooves are filled with a suitable filling J J to support the cores in a position concentric with the edges of the flanges $f\,g$ and so prevent them from assuming a position in which they would be liable to become detached from the rigid rings. The filling material is withdrawn wholly or partially when it is desired to remove the flexible rings. In this figure the outer ring or rim G is shown having a flat exterior surface forming a tire for running on a road. The said ring may, if desired, be fitted with another external metal or other tire.

In Fig. 4 I have shown a modification wherein the rings F G are furnished with inwardly-turned flanges, forming circumferential hooks $f^4\,g^4$, and the edges $e\,e'$ of the flexible rings E E are formed by closely-packed coils of cord, for example, or other suitable material that is sufficiently rigid. The said edges are shaped to fit the hooks $f^4$ and $g^4$, and when engaged with the said hooks they are firmly supported thereby, and the cores $e'$ are prevented from collapsing, while the cores $e$ are prevented from expanding when subjected to the air-pressure in the tube D. The cores are maintained in engagement with the hooks $f^4$ and $g^4$ by the air-pressure within the tube D. In lieu of the continuous circumferential hooks on the outer ring above described I may use metal hooks at intervals for supporting the cores $e'$. Upon the deflation of the inner tube it is obvious that the cores in the outer ring can be detached from the hooks $f^4\,g^4$. The solid rubber tire H may be secured to the rim G' by being vulcanized thereon during the process of manufacture.

In Fig. 5 I have shown a further modification resembling Fig. 1, except that the outer ring or rim G is constructed with a flange G' to run in the groove of a rail. This form of wheel is suitable for a tram-car.

Fig. 6 shows a pair of tram-car wheels each constructed with an air-cushion according to my invention and having the outer rigid rings G connected by a tube or sleeve K, so as to preserve an accurate gage or distance between the flanges G' of the wheels. The said sleeve surrounds the axle L and is formed with flanged ends L', that connect the sleeve to the rings G. The annular space between the sleeve K and the axle is sufficient to allow of the required amount of movement or vibration of the outer rings G relatively to the inner rings F. In case of deflation of the air-tube, whether accidental or otherwise, the axle will rest against the sleeve K and prevent injury to the flexible rings E E and tube D. The tube K may be cast in one with the rings G, as shown, or the rings G and sleeve K with its flange may be built up from separate parts secured together. Tie-rods may be substituted for the sleeve. It will be obvious that the rings F and G are not limited in width, and they may be as wide as the vehicle, in which case the said rigid rings become long tubular casings constructed at their ends to receive the flexible rings which with the tubular casings form the inclosing walls of the air-chamber. I sometimes connect the opposite flexible rings by a transverse web or diaphragm at their inner or outer edges for the purpose of protecting the inner inflatable tube.

In Fig. 7 I have shown a suitable form of material for making the flexible rings. It consists of a layer of strong threads $m$, arranged in a ring, as shown, and inclined at a uniform angle to the radii, extending from their inner ends and crossed by another layer of similar threads $n$, inclined in the opposite direction, the whole being united by india-rubber solution and, if desired, strengthened by additional layers of threads similarly arranged. The edges of the fabric so formed are turned over the wire cores $e\ e'$ and secured by stitching or otherwise. One or both sides of the flexible ring so formed is or are protected by a layer of india-rubber or by other suitable material, or the rubber may be dispensed with, and the fabric is then coated with a suitable waterproof varnish. In some cases I form the flexible rings of layers of woven fabric having a warp or weft, and in such case I arrange the layers so that the direction of the threads in one layer is different from that in another layer, whereby a uniformly strong fabric is produced.

It will be obvious that my improved wheel is not only adapted for use on heavy road-vehicles, but it is also adapted to serve as a driving-pulley, in which case the outer ring G is formed with a flat or curved smooth outer periphery, like an ordinary belt-pulley, or the improved air-cushion above described may be used in any wheel where it is desirable to reduce vibration.

Although I prefer to use endless wire cores, as above described, it is obvious that wire rings not endless may be used, the ends of said rings being connected together by any mechanical device or brought through a hole or holes in the outer rigid ring and secured by a nut or otherwise.

What I claim is—

1. In a wheel the combination with concentric rigid rings the inner being exteriorly and the outer interiorly grooved or provided with side flanges, of an air tube or chamber interposed between the two rings, and side rings of flexible non-expansible material having inner and outer edges reinforced in the manner described, and contained in the grooves of the rigid rings and held in engagement with the flanges or sides thereof by the action of air-pressure in the tube confined by said flexible rings, as set forth.

2. In a wheel, the combination of an inner rigid flanged ring, two flexible side rings having inextensible inner edges and incompressible outer edges, and an outer rigid flanged ring the latter being constructed with shoulders forming seats for the incompressible edges of the flexible rings, and with a groove to permit of the said incompressible edges being placed eccentric to the flanges of the outer rigid ring to allow of the withdrawal of the said edges through the inturned flanges of the rigid ring, and an annular air-tube inclosed by the said rings, substantially as described.

3. In a wheel, the combination of an inner rigid flanged ring, two flexible side rings having inextensible inner edges and incompressible outer edges, and an outer rigid flanged ring the latter being constructed with a groove to allow of the incompressible edges of the flexible rings being placed eccentric to the flanges of the outer rigid ring, a removable filling for said groove to maintain the said incompressible edges concentric with the flanges of the outer rigid ring, and an annular air-tube inclosed by the said rings, substantially as and for the purposes specified.

4. In a wheel, the combination with two concentric rigid rings, the inner being exteriorly and the outer interiorly grooved or formed with side flanges, of an air-tube between the two rings, two side rings of flexible non-expansible material, and inextensible cores in their inner edges and non-compressible cores in their outer edges, the cored edges being contained in the grooves of the rigid rings and held in contact with the flanges thereof by the inflation of the air-tube, as set forth.

5. In a wheel, the combination with two concentric rigid rings, the inner being exteriorly and the outer interiorly grooved or formed with side flanges, of an air-tube between the two rings, and two side rings of flexible material reinforced at their inner and outer edges and composed of layers of closely-packed threads arranged to cross each other obliquely, the reinforced edges of said side rings being contained in the grooves of the rigid rings and held in contact with the flanges thereof by the inflation of the air-tube, as set forth.

6. The combination of a pair of tram-car wheels each having an inner and an outer rigid flanged ring, and two flexible side rings inclosing an annular air-chamber, said flexible rings having inextensible inner edges and incompressible outer edges inclosed by the flanges of the rigid rings, and a rigid connection between the outer rigid rings of the two wheels to maintain a constant gage, substantially as described.

In testimony whereof I have hereunto set my hand this 7th day of January, 1897.

CHARLES KINGSTON WELCH.

Witnesses:
GEORGE HARRISON,
A. B. CROFTS.